March 7, 1961 E. C. HORTON 2,973,542
WINDSHIELD CLEANER
Filed Nov. 22, 1955
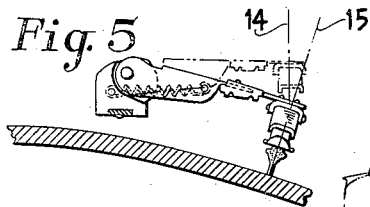
Fig. 5
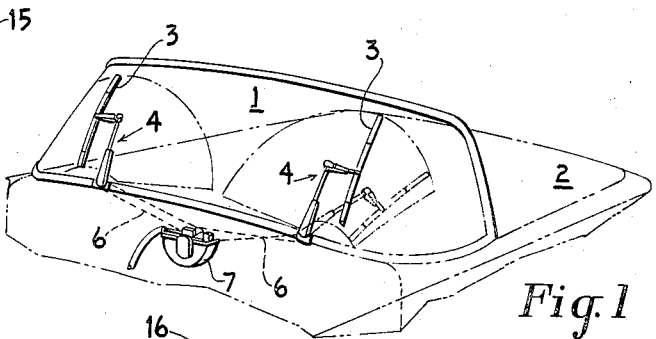
Fig. 1
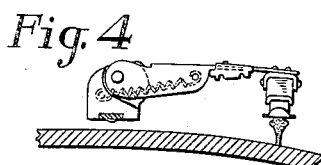
Fig. 4
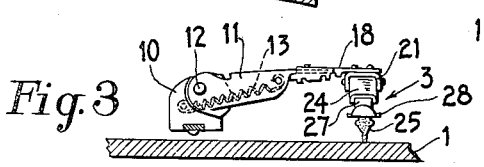
Fig. 3
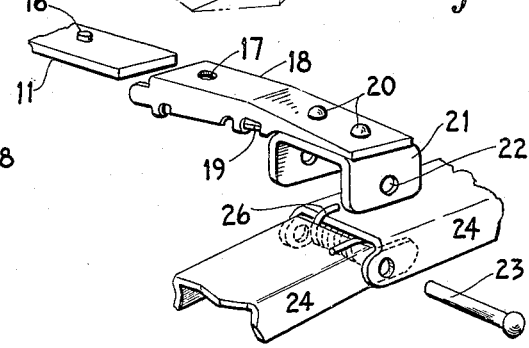
Fig. 6
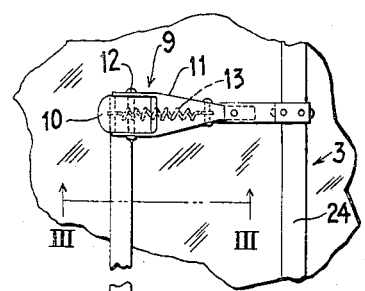
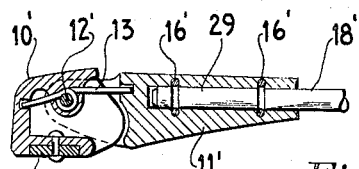
Fig. 7
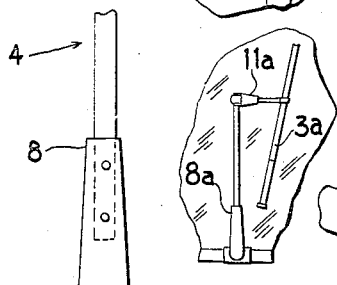
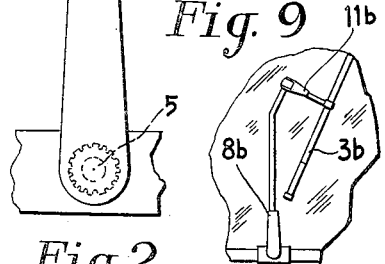
Fig. 2    Fig. 10
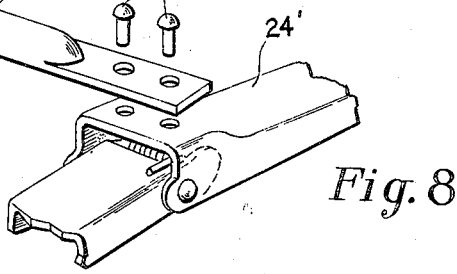
Fig. 8
INVENTOR.
Erwin C. Horton
BY
Bean, Brooks, Buckley & Bean

United States Patent Office 2,973,542
Patented Mar. 7, 1961

2,973,542
WINDSHIELD CLEANER

Erwin C. Horton, Hamburg, N.Y., assignor to Trico Products Corporation, Buffalo, N.Y.

Filed Nov. 22, 1955, Ser. No. 548,346

16 Claims. (Cl. 15—250.23)

This invention relates to a windshield cleaner especially designed for the cleaning of curved windshields. In the modern automobile the windshield has its curvature accentuated in its opposite side portions through relatively sharper bends for extending the field of vision laterally through the more deeply curved or wrap-around side portions for affording a panoramic field of vision. The windshield wiper as employed for this type of contour embodies a flexible wiping blade backed by a surface conforming backing to which the arm pressure is distributed throughout its length to effect surface conformance. For best results it is desired to have the flexible backing of strip form with the underface of the strip lying substantially parallel to the surface being wiped. This maintains the wiping blade in an attitude substantially normal to the surface in order to avoid the side margins of the backing coming into scratching contact with the surface. Such a wiper is shown and described in Patent No. 2,691,186 wherein the wiping element has imparted to it a controlled rotation about its longitudinal axis for maintaining the blade in a normal attitude as it moves about the curved surface contour.

In accordance with the present invention the normalizing action of the wiper is accomplished through a novel actuating arm construction having a mount by which the wiper is bodily adjusted as it moves outwardly toward the receding side portion of the windshield with the blade positioning action preceding that of the arm so that the position of the blade is changed to match the curvature of the windshield.

A further object of the invention is to provide a normalizing wiper mount having a better control against the lifting tendency of wind currents encountered during the forward travel of the vehicle. In this respect, the inherent construction of the wiper arm causes the sliding friction of the wiper blade during its outboard travel to be converted into a turning couple which bears the wiper down against the windshield with an increased force, thereby providing greater resistance against lifting of the blade by the wind at high vehicle speeds. Furthermore, because of its inherent construction, the wiper blade converts the sliding friction produced by the wiper during its inboard travel into a couple which tends to lift the wiper blade over the crest of the curved windshield. During this latter action, the spring which causes the wiper blade to bear against the windshield, is tensioned to a greater degree, thereby providing increased resistance against wind-lift during the inboard travel of the wiper blade.

Again, the invention resides in the provision of an oscillatory actuating arm construction by means of which the wiper is laterally offset and mounted to swing bodily about a radial axis, the wiper extending parallel to the axis and assuming a normal attitude with respect to a radial plane, the relation between the offset distance and the rate of rise and fall of the glass surface from the path of the actuating arm being such as to hold the wiper substantially in a normal attitude at all times during its corresponding rise and fall motion.

A still further object of the invention is to provide a simplified wiper normalizing mount wherein the wiper, as it travels outwardly over the wrap-around windshield side portions, will bodily change its position to maintain its normal attitude.

The foregoing and other objects will manifest themselves as this description progresses, reference being had to the accompanying drawing, wherein Fig. 1 is a diagrammatic perspective view showing the wiper installation on a windshield;

Fig. 2 is a fragmentary front elevation of the improved wiper arm assembly;

Figs. 3, 4 and 5 are transverse sectional views about on line III—III of Fig. 2 showing the wiper mount in various positions assumed in moving over flat and curved contours;

Fig. 6 is an exploded fragmentary view of the wiper mount;

Fig. 7 is a longitudinal section through a modification;

Fig. 8 is an exploded view of a modified mount; and

Figs. 9 and 10 are schematic views showing other blade and arm arrangements.

Referring more particularly to the drawing, the numeral 1 designates the windshield of a motor vehicle 2 having a pair of wipers 3 mounted thereon by wiper arm assemblies 4, which latter are carried by oscillatory shafts 5 in turn connected by cable transmissions 6 into a motor 7.

The wiper arm assembly comprises a rigid arm body 8 that has its path of movement confined substantially to a surface of generation. Carried on its outer end is the wiper mount 9 which comprises a mounting section 10, fixed to the arm, and a spring pressed section 11 connected to the mounting section 10 by a pivot 12. The section 11 is in the nature of a relatively short arm, as compared to the rigid arm 8 and extends outwardly to the side therefrom so that as the arm moves toward the side of the vehicle its wiper 3 will be in advance of the moving rigid arm. The relatively short arm section may be pivoted directly upon the arm and for this reason the mounting section 10 may be considered a fixed part of the rigid arm. A coil tension spring 13 has its opposite ends anchored respectively on its sections 10 and 11 to urge the wiper toward the windshield surface and consequently, as the arm assembly moves outwardly from the position shown in Fig. 3 to the position shown in Figs. 4 and 5, the spring will cause the short arm section 11 to swing downwardly. In other words, the wiper will move in an an arc about the axis 12 and in so doing will automatically maintain the attitude of the blade with the immediate underlying surface portion, as indicated by the two center lines 14 and 15. For this purpose, the wiper will be fixed to the outer end of the normalizing arm 11 against lateral rocking.

The connection between the outer end of the normalizing arm 11 and the wiper may be detachable, as shown in Fig. 6 wherein the arm is provided with an upstanding lug 16 for engaging in a recess 17 formed in the clip 18, the interlock being maintained by a flat spring 19, in a well-known manner. The clip is fixedly secured, as by rivets 20, to a U-shaped bracket 21 and the sides of the bracket are formed with openings 22 to receive the pin 23 that forms the hinge pin for the levers 24 forming a part of the pressure distributing superstructure by which the urge of spring 13 is distributed throughout the length of the rubber squeegee 25. A spring 26 reacts upon the two levers 24 to urge their outer ends downwardly for the transmission of the arm pressure through underlying secondary yokes 27 to a flexible backing strip 28. By reason of this construction the wiper mount 10, 11 supports the wiper for up and down movement toward and from the windshield clip but, by means of the bracket 21 and the pressure distributing superstructure 24, 27, the backing strip will be held with its underface parallel to the glass surface. Therefore, the squeegee unit 25, 28 will be carried bodily by the normalizing arm 11 as the curvature recedes, a proper relationship between the length of this arm and the rate of fall away of the curved surface from the path of the fixed arm 8 being predetermined.

In the modified showing of Figs. 7 and 8 the outer end of the normalizing arm is formed with a socket 29 to receive a wiper attaching clip or stem 18', keeper members 16' being employed to secure the stem within the socket in a manner to permit relative pivotal movement. The outer end of the stem may be fixed to one of the pressure distributing levers 24', as by means of fasteners 20'. The normalizing arm 11' is hingedly connected to the mounting section 10' by a pivot pin 12', and the spring urge is applied to the normalizing arm by a convolute spring 13. In the modified construction the pivotal attachment 18' enables the wiping blade to readily adjust itself to the windshield surface during its bodily movement as provided for by the normalizing arm. For this reason the wiping blade may be rigid on the stem 18' since the pivotal mounting will serve to equalize the pressure application on the opposite ends of the squeegee.

The bodily movement of the wiper is about the pivot 12 which latter moves in a fixed path and from which path the surface contour recedes in an outward direction, and in so doing, the position of the blade is changed to maintain its attitude substantially normal to the surface at all times. This is accomplished by mounting the blade so that its wiping edge will extend substantially in a plane lying tangentially of the arcuate path of the blade which is concentric to the hinge axis 12, and therefore, if the blade carrying section 11 is properly related as to its length with respect to the rate of fall away of the windshield glass curvature from the primary arm 8, the normal attitude will be substantially assured. The normalizing arm is relatively short and any lifting force of the wind on the rigid arm will not make any change in the amount of arm pressure transmitted to the wiper, thereby affording better control of the wiping action in the presence of strong wind currents. Preferably the wiping blade is positioned substantially parallel to the arm but other dispositions of the blade may be provided such as is shown in Figs. 9 and 10. In Fig. 9 the wiping blade 3a is shown oblique with respect to the spring pressed section or normalizing arm 11a, which latter extends at right angles from the arm 8a. The pivot for this arm 11a is lengthwise of the arm 8a and therefore oblique to the blade 3a. In this oblique position the pivot converges inwardly toward the inner end of the blade. In Fig. 10 the wiping blade 3b is disposed at right angles to the normalizing arm 11b, the latter being arranged oblique to the arm body 8b. The wiper arm assembly has its major body portion operating in a fixed path and carries a resilient wiper mount extending laterally therefrom toward the side of the car so that the outwardly moving rigid arm will support the advancing wiper to rise and fall in accordance with the curvature and in so doing will maintain the wiper normal, or substantially normal, to the glass by means of a simple and durable structure.

The construction is economical and practical, and while the foregoing description has been given in detail, it is without thought of limitation since the inventive principles involved are capable of assuming other physical embodiments without departing from the spirit of the invention and the scope of the appended claims.

What is claimed is:

1. In combination with a windshield having curved wrap-around lateral portions, a cleaner therefor comprising an actuating arm movable back and forth in a definite path relative to a lateral portion, a wiping blade, a carrier for the blade extending transversely of the arm toward the lateral portion and hingedly mounted on the outer end portion of the arm for swinging in an arcuate path transversely of the arm path and about an axis extending substantially lengthwise of the arm, the wiping blade being positioned substantially parallel to said arm and with its wiping edge normal to a plane radial of the hinge axis, the arm and lateral portion being related to cause the wiping edge to remain substantially normal to the curvature, and spring means for holding said blade against the surface being wiped.

2. In combination with a windshield having curved wrap-around lateral portions, a cleaner therefor comprising an actuating arm movable back and forth in a definite path relative to a lateral portion, a wiping blade, a carrier for the blade extending transversely of the arm toward the lateral portion and hingedly mounted on the outer end portion of the arm for swinging in an arcuate path transversely of the arm path and about an axis extending substantially lengthwise of the arm, the wiping blade being positioned substantially parallel to said arm, and spring means for holding said blade against the surface being wiped.

3. A cleaner for curved windshields, comprising a wiping blade, an actuating arm therefor oscillating in a fixed plane, a normalizing blade mount hinged to the outer end of the actuating arm to swing about an axis parallel to the arm, and spring means acting to rotate the normalizing mount toward the surface being wiped, said wiping blade paralleling the arm and having a wiping edge extending substantially tangential to an arcuate path concentric about the axis.

4. A curved windshield cleaner comprising a wiper actuating arm carrying a laterally extending mount embodying a hinge the axis of which extends in the direction of extent of the arm, the mount outwardly of the hinge having a wiper seat movable about the hinge axis toward and away from the surface to be wiped for holding a wiping blade substantially parallel to the arm, and spring means for urging the wiper seat about the hinge axis toward the surface.

5. A curved windshield cleaner comprising an elongate wiper, an oscillatory actuating arm therefor having a part movable through a definite path, and a wiper mount portion extending laterally from the outer end of the arm and embodying a hinge between said arm and said wiper mount portion the axis of said hinge lying substantially parallel to the extent of the arm, said wiper being carried by said mount portion outwardly of the hinge and movable about the axis thereof with its longitudinal dimension extending substantially parallel to the arm axis and its wiping edge lying substantially normal to the surface to be wiped, and spring means for holding the wiping edge against the surface.

6. A curved windshield cleaner comprising a wiper, an oscillatory actuating arm therefor movable through a definite path, and a mount extending laterally of the arm and toward the adjacent side of an associated windshield, said mount embodying a hinge the axis of which lies substantially parallel to the arm, said wiper being carried by a mount portion outwardly of the hinge for movement about the axis thereof toward and away from the surface to be wiped and having a wiping edge extending substantially parallel to the arm axis and normal to a radial plane therethrough, and spring means for holding the wiping edge against the surface.

7. A cleaner for curved windshields, comprising a wiper, an actuating arm therefor oscillating in a fixed plane, a relatively short normalizing arm pivotally mounted on the outer end of the actuating arm and extending laterally therefrom to swing about an axis extending substantially lengthwise of the actuating arm, spring means acting to rotate the normalizing arm toward the surface being wiped, and means fixedly relating the wiper on the normalizing arm to extend substantially tangentially to an arcuate path concentric about the axis.

8. A cleaner for curved windshields, comprising a wiper actuating arm having a laterally extending wiper carrying member hinged proximate its outer end to swing about an axis extending substantially lengthwise of the actuating arm, spring means acting to bias said wiper carrying member toward the surface being wiped, and a wiper mounted on said member for pivoting about an axis extending generally toward the hinge axis.

9. A curved windshield cleaner comprising an elongated wiper, an oscillatory actuating arm therefor, a wiper mount extending laterally from the outer end of the arm and embodying a hinge the axis of which lies substantially parallel to the extent of the arm, said actuating arm being supported rigidly on an oscillatory shaft with its axis of oscillation determined so that the outer end of said arm will be relatively closer to the surface of a curved windshield when it operates over the relatively flat portion thereof and farther from the surface as it moves out over the relatively more curved portion thereof, said wiper mount carrying said wiper and being effective to modify the attitude of said wiper and to function according to the distance of the end of said arm from the surface over which the wiper is functioning, and spring means for holding said wiper against the surface.

10. For use on a curved windshield having a frontal area and a lateral area joined together by a merging corner area, providing a continuous path for blade travel wherein the windshield merging surface recedes from the frontal area to the lateral area, a shaft supported arm section rigidly mounted on an oscillating shaft, and a blade carrying section extending laterally from and pivoted on the shaft supported section by a pivot that is oblique to the centerline of the blade in such a manner that the sliding friction of the blade on the windshield surface will develop a turning couple about to the axis of the blade pivot of such a nature that it will tend to bear the blade down against the windshield surface while the blade is moving outwardly onto said lateral area, and likewise tend to assist in lifting the blade up as it moves back off from the receded area onto the adjacent frontal area of the windshield, and spring means effective to hold said blade in pressurized contact with the windshield surface area over which it is being operated.

11. In combination with a windshield having curved wrap-around and receding lateral portions, a cleaner therefor comprising an actuating arm movable back and forth about an axis in a definite arcuate path relative to a lateral portion, a wiping blade, an outer arm section operating transversely of the path and extending laterally from and hingedly mounted on the actuating arm for swinging in an arcuate path transversely of the first path and about an axis that is oblique to the longitudinal axis of the blade, the wiping blade being positioned on the outer arm section with its longitudinal axis substantially radial to the axis of the back and forth arm movement and with its wiping edge substantially normal to a plane radial of the hinge axis, and spring means effective to hold said blade in pressurized contact with the windshield surface area over which it is being operated.

12. A curved windshield cleaner comprising an elongated wiper, an oscillatory actuating arm therefor having a part following a definite path of movement, and an arm extension extending laterally from and mounted on the outer end of the actuating arm and embodying a spring hinge the axis of which extends oblique to the longitudinal axis of the wiper, said wiper being carried by the extension outwardly of the hinge axis and having its longitudinal axis extending substantially in a radial direction from the center of oscillation of said actuating arm and its wiping edge lying substantially normal to the surface to be wiped, said wiping edge rising and falling transversely of the path of the actuating arm in an arcuate path about the hinge axis.

13. For use on a curved windshield having a frontal area and a lateral area joined together by a merging corner area, providing a continuous path for blade travel wherein the windshield merging surface recedes from the frontal area to the lateral area, a shaft supported arm section rigidly mounted on an oscillating shaft, a blade provided with means extending laterally from said shaft supported section for pivotally mounting the blade on the arm on on axis oblique to the center line of the blade, and spring means for holding said blade against the surface being wiped.

14. A windshield wiper blade mounted on a wiper carrying member extending laterally from and mounted on an oscillating arm supported on a shaft against substantial movement in a direction toward and away from an associated windshield during a wiping operation, said wiper carrying member being pivoted on a pivot on said arm, said pivot being oblique to the longitudinal axis of said blade, and spring pressure means effective to hold said blade in pressurized contact with the windshield.

15. A wiper actuating arm having a part for mounting on an oscillatory shaft and extending radially therefrom to follow a definite path, said arm having a wiper carrying mount for carrying a wiper joined thereto by a hinge axis which extends generally lengthwise of the arm, said wiper being laterally displaced from the longitudinal axis of the arm but maintaining the same general direction relative to said shaft throughout its travel, said mount outwardly of the hinge having a wiper seat for holding said wiper, and spring means for urging said mount about said hinge axis toward the surface to be wiped.

16. A windshield wiping construction for cleaning portions of a curved windshield comprising a first wiper arm portion mounted on a shaft against substantial movement in a direction toward and away from an associated windshield and adapted to traverse a predetermined path, a second wiper arm portion mounted on said first arm portion for movement in a direction toward and away from an associated windshield, said second arm portion having an axis adapted to extend transversely of the axis of said first arm portion, said second arm portion also adapted to extend laterally from said first wiper arm portion with respect to the edge of a windshield during a wiping operation, a wiper mounted on said second arm portion, and means for effecting a change in orientation between said first and second arm portions as said wiper traverses portions of the windshield.

References Cited in the file of this patent
UNITED STATES PATENTS

| | | |
|---|---|---|
| 2,270,589 | Hansen | Jan. 20, 1942 |
| 2,605,491 | Williams | Aug. 5, 1952 |
| 2,752,626 | Oishei | July 3, 1956 |
| 2,849,742 | Gores | Sept. 2, 1958 |